(No Model.) 3 Sheets—Sheet 2.
I. D. & E. E. L. BOYER.
MACHINE FOR MAKING CARAMELS.
No. 583,024. Patented May 25, 1897.
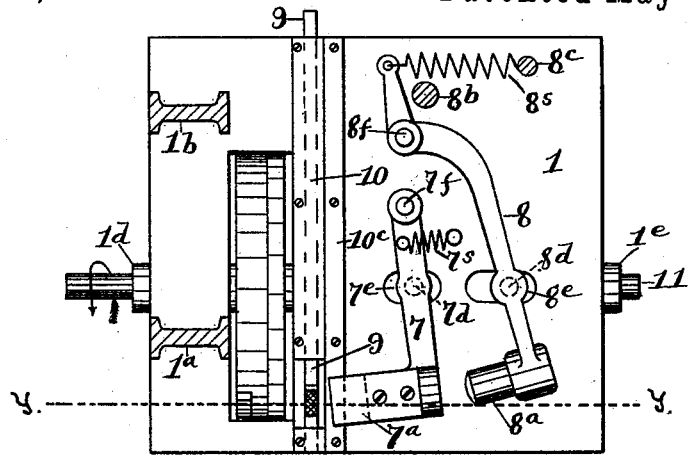
Fig 3.
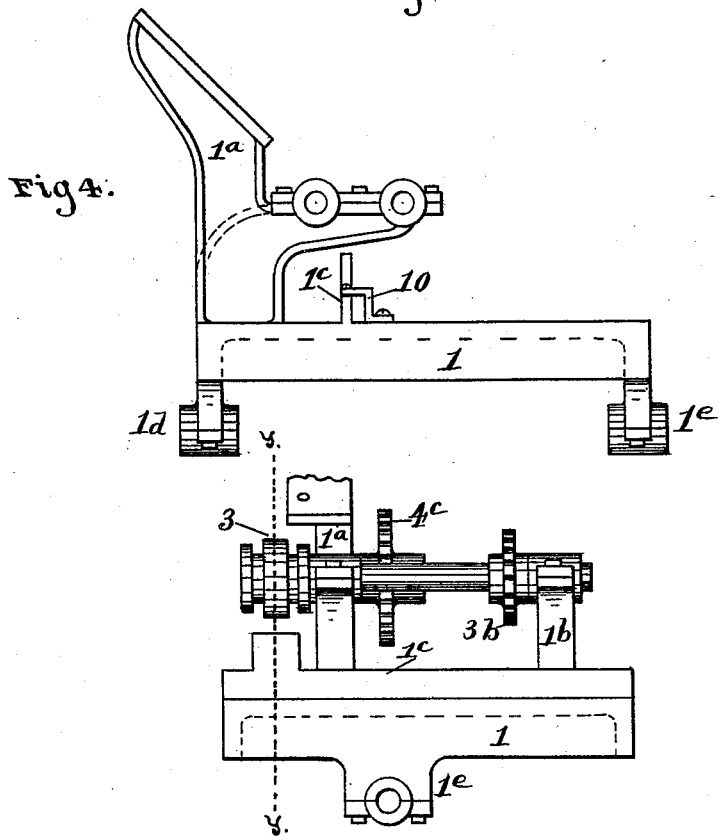
Fig 4.
Fig 5.
WITNESSES:
L. L. Allen
H. J. Himes
INVENTORS.
J. D. Boyer and
E. E. L. Boyer.
BY R. J. McCarty,
Their ATTORNEY.

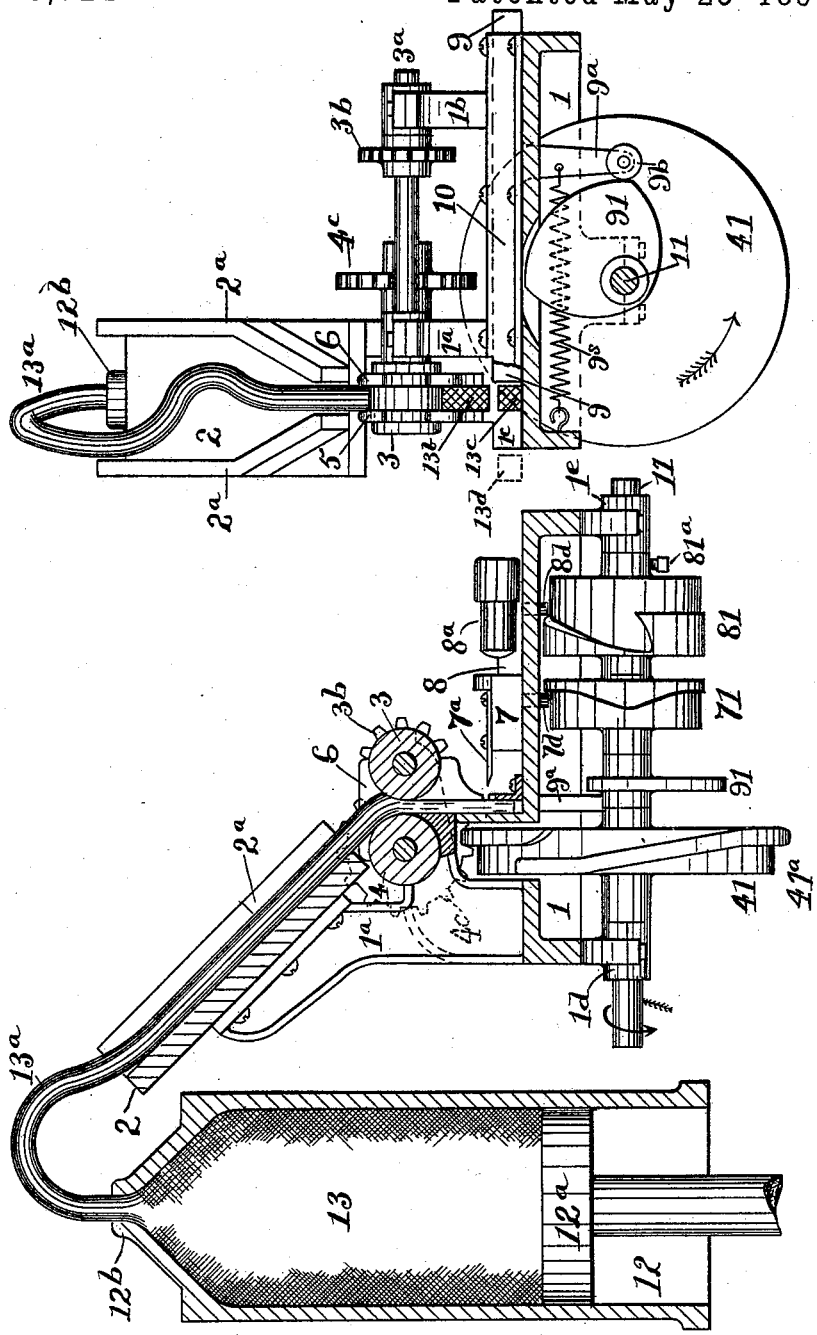

(No Model.) 3 Sheets—Sheet 3.

I. D. & E. E. L. BOYER.
MACHINE FOR MAKING CARAMELS.

No. 583,024. Patented May 25, 1897.

WITNESSES:
L. L. Allen
H. J. Himes

INVENTORS.
I. D. Boyer, and
E. E. L. Boyer.
BY R. J. McCarty
Their ATTORNEY.

UNITED STATES PATENT OFFICE.

ISRAEL DONALD BOYER AND EDITH E. L. BOYER, OF DAYTON, OHIO.

MACHINE FOR MAKING CARAMELS.

SPECIFICATION forming part of Letters Patent No. 583,024, dated May 25, 1897.

Application filed July 3, 1896. Serial No. 597,993. (No model.)

*To all whom it may concern:*

Be it known that we, ISRAEL DONALD BOYER and EDITH E. L. BOYER, citizens of the United States, residing at Dayton, in the county of Montgomery and State of Ohio, have invented certain new and useful Improvements in Machines for Making Caramels; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

The objects of our invention are to facilitate the forming of individual caramels from a mass of the caramel dough, to avoid waste, to save labor, to protect the dough from the influences of the weather, and, further, to deliver the formed caramels successively at one given point, where they may be readily taken by an automatic wrapping or packing machine. To accomplish these various objects, we have devised special mechanism for the purpose, all which will be specifically pointed out in the following specification.

Figure 6:
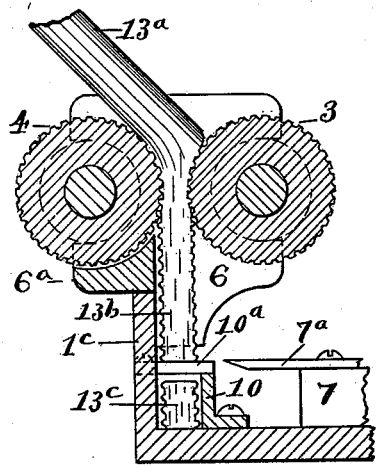
Figure 7:
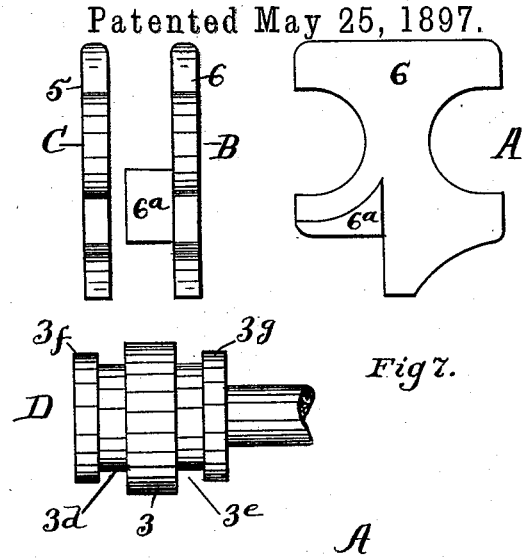
Figure 8:
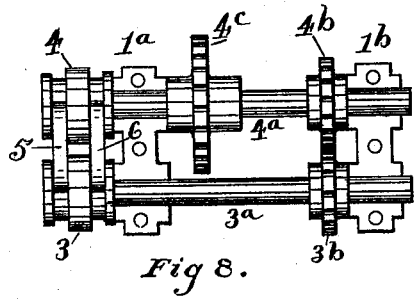
Figure 9:
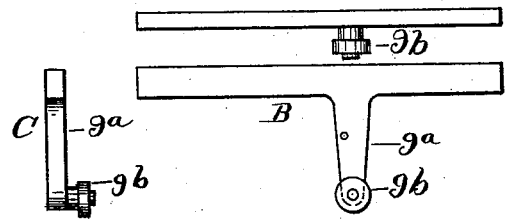
Figure 10:
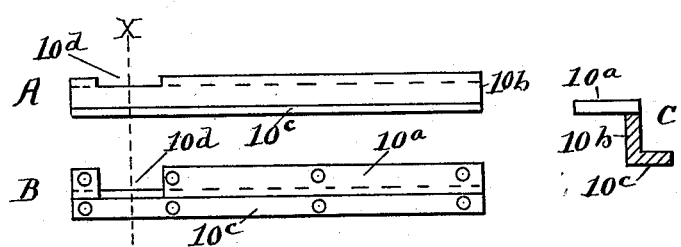
Figure 11:
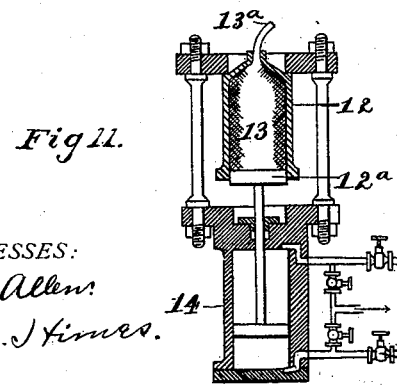

Referring to the drawings, Figure 1 is a side elevation of our apparatus, partly in section, on the line $yy$, Figs. 3 and 5. Fig. 2 is a front elevation of the same partly in section. Fig. 3 is a plan with the feed-rolls and their supporting-brackets removed. Fig. 4 is a side elevation of the frame alone. Fig. 5 is a front elevation of the frame with the feed-rolls and their shafts in place, but with all other parts removed. Fig. 6 is an enlarged transverse section through the feed-rolls. Fig. 7 shows on an enlarged scale the details of the feed-roll construction, A being a side view of one of the metal guard-plates, B being an edge view of the same, C being an edge view of its mate, D being one of the feed-rolls. Fig. 8 is a plan view of the two feed-rolls, with their shafts, gears, guard-plates, and journal-boxes. Fig. 9 gives three views of the delivery-plunger with its cam-following roller, A being a plan view, B being a front elevation, C being an end view. Fig. 10 gives three views of the cap or housing which forms a guideway for the delivery-plunger and also a receptacle or passage-way for the cut-off caramel until it is pushed out from the machine, A being a front elevation, B being a plan, C being an enlarged section on line $xx$. Fig. 11 shows on a small scale a sectional view of the hydraulic press with its valves and pipes and with the candy-cylinder in position in the press.

The reference-numbers have all been marked upon a regular system, as follows: Each principal part is designated by some one number which refers to it as a whole. Auxiliary parts or even portions of the main part are designated by the same generic number with a specific letter affixed.

Heretofore in making caramels the practice has been to pour the melted material directly from the boiling-kettle into a large flat pan to cool, then to pass it through one or more sets of reducing-rolls, which would bring the plastic cake to the proper thickness. It would then be laid on a sheet of pasteboard and passed beneath revolving cutters, which converted it into strips. The pasteboard with the strips upon it would then be passed a second time under the revolving cutters in such manner as to convert the strips into little square caramels.

Among the disadvantages attendant upon this method may be mentioned the following:

First. The revolving cutters do not generally make a clean cut, but the caramels usually hang together more or less by a thin fin of the material. To separate them, they are usually thrown about or jolted for awhile. Even after this some still remain attached to each other and must be broken apart by hand.

Second. The edges of the original sheet as it comes from the reducing-rolls are irregular in outline and consequently will not form square caramels, but must be thrown into the scrap to be reworked.

Third. In their second passage beneath the cutters the strips often drag irregularly, causing them to become curved or bent, and consequently they do not pass through the cutters at right angles to their first passage, but at various and irregular angles, thereby forming a variety of diamond-shaped caramels, which often deviate so far from the correct shape that they must be thrown into the scrap to be reworked.

Fourth. The candy from the time it is poured out of the boiling-kettle until it is finally wrapped is constantly exposed to the atmospheric influences, and these often cause serious annoyances. A humid atmosphere causes the candy to become sticky, and it is then much more difficult to work, manifesting a tendency to stick to the machinery, and the formed caramels also become sticky and adhere together in a very annoying manner.

By our improved mechanism the candy 13 is poured directly from the boiling-kettle into the cylinder 12 and there allowed to cool. The cylinder is then inverted and placed in a hydraulic or other suitable press and a piston $12^a$ forced upward into it, thereby expelling the candy through the nozzle $12^b$ in a continuous circular strip $13^a$. The issuing strip of candy soon bends over by its own weight. It is directed upon an inclined board 2, having upwardly-projecting side pieces $2^a$, which converge at the bottom, so as to lead the strip of candy to the feed-rolls 3 and 4. These feed-rolls are corrugated, as shown in the enlarged view, Fig. 6, so as to draw in the candy. As the candy passes between them it is flattened out; but it is prevented from spreading too far laterally by the side or guard plates 5 and 6, which fit in grooves $3^d$ and $3^e$ in the feed-rolls, as will be clear from an inspection of Fig. 7. The strip of candy is thus changed from a circular to a rectangular section, as at $13^b$. These rolls are geared together by the two gears $3^b$ and $4^b$ and are driven by the gear $4^c$ through the instrumentality of the cam-rib $41^a$ on the periphery of wheel 41, as is clearly shown in Fig. 1. This cam is so formed that at each revolution of the main shaft it feeds the candy through just the proper distance to make one caramel. It then gives a dwell, during which the chisel $7^a$ cuts off the lower end of the rectangular strip $13^b$, thereby making the isolated caramel $13^c$, which drops a short distance and is caught in a sort of pocket, where it lies directly in the path of the delivery-plunger 9. (See Figs. 2 and 9.) This plunger is actuated by a cam 91 on the main shaft 11. The cam serves to retract the plunger, so that the cut-off caramel may drop directly in front of it, as shown in Fig. 2 at $13^c$. Here the caramel is shown as having been just cut off and the roller $9^b$ is just ready to descend the incline of cam 91, when the spring $9^s$ will cause the delivery-plunger to eject the caramel, delivering it to the position indicated by the dotted square $13^d$. Here it is taken by the fingers of an automatic wrapping-machine or otherwise disposed of. The circular strip of candy issues continuously from the nozzle of cylinder 12, but is fed forward intermittently by the feed-rolls 3 and 4, which are so proportioned and geared that at each movement they feed the strip forward just the proper distance to make a caramel.

It is scarcely possible to cause the strip of candy to issue from the cylinder at just exactly the proper rate to supply the feed-rolls. We regulate this by adjusting the admission-valve $14^a$ of the hydraulic cylinder 14. (See Fig. 11.) If the candy issues too fast from the nozzle, it will curl up upon the board 2. Should too much accumulate upon the board, the valve is moved a little farther toward its closed position, and, vice versa, when the supply on the board runs low the valve is opened a little wider.

The means for cutting off the caramel should now be explained more in detail. By a long series of trials and failures we were led to the adoption and use of the means here described. It was difficult to completely sever the caramel from the main body of the strip, a thin film or web still connecting the two. This caused a great deal of trouble until we discovered that by using a hammer in connection with the chisel a good, clean, and complete severance might always be effected. We found, further, that the candy itself varied very considerably in its nature. Sometimes it would be hard and brittle and at others soft and sticky, and these varying qualities necessitated corresponding variations in the cutting, hard candy needing to be cut almost entirely by a steady cut, with very little aid from the hammer, and that only at the last moment when the knife is nearly through. Then the hammer is permitted to strike the knife, the concussion breaking any thin fin of the material which may still be unsevered; but when the candy is soft the hammer should be allowed to strike the knife sooner, thus insuring a cleaner cut and less gumming of the knife. If the hammer strikes too early in the stroke of the knife, it will cause the candy to fracture instead of cut, this leaving an irregular surface. Even quite soft candy will fracture thus if the hammer strikes too soon. What is required is to have means of moving the knife steadily through the candy and other means of giving it a blow from a hammer and means to regulate the relative proportion of steady cut to impact, according to the varying nature of the material. This we accomplish by the mechanism illustrated in Figs. 1 and 3.

$7^a$ is the chisel or knife, screwed fast to the arm 7, which is pivoted at $7^f$, and has a stud $7^d$, projecting downwardly through a slot $7^e$ in the top surface of the table or frame 1. The lower end of the stud rides upon the cam 71, Fig. 1, being kept in contact with the cam by means of the coiled tension-spring $7^s$, Fig. 3. This cam 71 forces the knife through the candy with a steady positive motion. The hammer-head $8^a$ is carried on the end of arm 8, which is pivoted at $8^f$. It has a downwardly-projecting stud $8^d$, which rides upon the cam 81, Fig. 1, the spring $8^s$, Fig. 3, keeping the stud always against its cam. The cam has a gradual incline, which lifts the hammer against the action of its spring $8^s$, and then a dwell, which holds the hammer retracted until the drop-off place of the cam (seen in Fig. 1) comes opposite the stud $8^d$, when the spring 8ˢ causes the hammer to deliver its blow on the end of the knife-arm 7.

The cam 81 is secured to the shaft by the set-screw 81ᵃ, so that it may be shifted on the shaft, thereby changing its relation to the cam 71. By thus shifting cam 81 the hammer may be caused to drop off at any desired point during the stroke of the knife. The main shaft is shown projecting at the left-hand side of the frame in Figs. 1 and 3. This is for the driving-gear, which serves to connect it with the wrapping or packing machine used to take the caramels as they are delivered by the plunger 9.

Among the advantages of our improved mechanism may be named the following: First, the candy being inclosed in a cylinder is thoroughly protected from atmospheric influences and may be kept indefinitely without deterioration; second, being inclosed in a cylinder its temperature is more easily controlled, as the cylinder may be placed in water of any desired temperature or may be surrounded by a jacket; third, either hard or soft candy may be worked, the caramels being completely severed by a clean square cut; fourth, the caramels being cut and delivered successively do not come in contact with each other and hence cannot give trouble by adhering together; fifth, the device is entirely automatic until the cylinder is emptied; sixth, all scrap is avoided. It is true that there is always a piece remaining in the nozzle, but we throw all these pieces into another cylinder and force them out in the same manner, so that there is virtually no scrap.

We think it probable that other substances besides caramels may be handled in this same manner, and we do not wish to be understood as limiting ourselves to the handling of caramels alone. Neither do we wish to be limited to the use of a hydraulic press.

Having fully described our invention, we claim as new and desire to secure by Letters Patent—

1. In a machine for feeding caramel-dough, the combination of feed-rolls adapted to receive said caramel-dough in a narrow rope-like form, a chisel adapted to sever it into uniform pieces after it leaves the feed-rolls, a pocket into which the severed pieces fall, a delivery-plunger adapted to remove said pieces, and means for presenting the candy or dough to the feed-rolls, in the manner herein shown and described.

2. In a machine for feeding caramel dough or candy, the combination with feed-rolls, of guard-plates mounted on said rolls on each side of the contact portion of said rolls and providing with said rolls, a rectangular space in cross-section through which the candy is passed, a pocket into which said candy is fed, a chisel adapted to sever said candy, and a hammer adapted to strike said chisel at predetermined times.

3. In a machine for feeding caramel-dough, the combination of a cylinder from which said dough is forced in a narrow rope-like form, feed-rolls and guard-plates through which it is passed and given a different cross-sectional form, a chisel adapted to cut it into small rectangular pieces after it passes through said feed-rolls, a hammer adapted to strike said chisel at predetermined times to insure a proper cut of the candy, and a delivery-plunger to remove the cut pieces from the machine.

4. In a machine for feeding caramel-dough or like substances, the combination of feed-rolls through which the same is passed, a chisel adapted to cut it into small pieces after it leaves the feed-rolls, a hammer adapted to strike said chisel at predetermined periods to insure a proper cut, and means for actuating said parts in their proper time.

5. In a machine for feeding caramel-dough or like material, the combination with mechanism for reducing said dough from a bulk to a narrow rope-like form, of feed-rolls to which it is passed in the latter form, a chisel adapted to sever it into small pieces after it passes through said feed-rolls, a hammer adapted to strike said chisel, and means for regulating the time of impact of said hammer.

6. In a machine for feeding caramel-dough, the combination with the frame provided with a channel, of a delivery-plunger movable in said channel, feed-rolls mounted above said channel and adapted to feed candy therein, and a chisel movable across the upper side of said channel and adapted to cut the candy into small pieces and permit the said pieces to fall in the path of the delivery-plunger.

7. In a candy-cutting machine, a knife or chisel; means for moving said knife or chisel with a steady motion through the candy; a hammer adapted to strike said knife or chisel, and means for regulating the time of impact of said hammer; all in combination substantially in the manner and for the purpose specified.

In testimony whereof we affix our signatures in presence of two witnesses.

ISRAEL DONALD BOYER.
EDITH E. L. BOYER.

Witnesses:
R. J. McCARTY,
S. A. DICKSON.